(12) United States Patent
Saruta et al.

(10) Patent No.: US 8,917,942 B2
(45) Date of Patent: Dec. 23, 2014

(54) INFORMATION PROCESSING APPARATUS, INFORMATION PROCESSING METHOD, AND PROGRAM

(75) Inventors: Takayuki Saruta, Tokyo (JP); Masato Aoba, Tokyo (JP); Masakazu Matsugu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 137 days.

(21) Appl. No.: 13/379,413

(22) PCT Filed: Jun. 21, 2010

(86) PCT No.: PCT/JP2010/004130
§ 371 (c)(1),
(2), (4) Date: Dec. 20, 2011

(87) PCT Pub. No.: WO2010/150515
PCT Pub. Date: Dec. 29, 2010

(65) Prior Publication Data
US 2012/0099798 A1    Apr. 26, 2012

(30) Foreign Application Priority Data

Jun. 25, 2009 (JP) .................................. 2009-151479

(51) Int. Cl.
*G06K 9/46* (2006.01)
*G01B 11/00* (2006.01)

(52) U.S. Cl.
CPC .................................... *G01B 11/002* (2013.01)
USPC ............................ 382/203; 382/209; 382/216

(58) Field of Classification Search
CPC ....... G06K 9/48; G06K 9/643; G06K 9/4604; G06K 9/52; H04N 7/26643; G06T 7/001; G06T 2207/30108; G06F 17/156
USPC ......... 382/162, 224, 157, 154, 209, 203, 216; 348/46, 135, 142, 188; 250/435; 356/241.1, 337; 702/127
See application file for complete search history.

(56) References Cited

U.S. PATENT DOCUMENTS

| | | | | |
|---|---|---|---|---|
| 6,459,481 | B1 * | 10/2002 | Schaack ...................... | 356/241.1 |
| 8,059,889 | B2 * | 11/2011 | Kobayashi et al. ........... | 382/154 |
| 8,311,342 | B2 * | 11/2012 | Schopp et al. ................ | 382/224 |
| 2006/0273268 | A1 | 12/2006 | Bae | |

FOREIGN PATENT DOCUMENTS

| CN | 101086442 A1 | 12/2007 |
|---|---|---|
| JP | 8-105720 A | 4/1996 |
| JP | 9-212643 A | 8/1997 |
| JP | 2000-293695 A | 10/2000 |
| JP | 2002-197443 A | 7/2002 |
| JP | 2005-121486 A | 5/2005 |
| JP | 2006-343310 A | 12/2006 |

* cited by examiner

*Primary Examiner* — Anh Do
(74) *Attorney, Agent, or Firm* — Canon USA, Inc. IP Division

(57) ABSTRACT

An information processing apparatus for matching a position and/or orientation of a measurement object with that of a model of the measurement object includes an acquisition unit configured to acquire a captured image of the measurement object, a calculation unit configured to calculate information indicating a surface shape of the measurement object based on the captured image, and a limitation unit configured to limit a position and/or orientation of the model based on the information indicating the surface shape.

25 Claims, 21 Drawing Sheets

INFORMATION PROCESSING APPARATUS, INFORMATION PROCESSING METHOD, AND PROGRAM

TECHNICAL FIELD

The present invention relates to an information processing apparatus that compares a measurement object with a model of the measurement object.

BACKGROUND ART

In recent years, a demand for causing robots to do tasks such as assembly performed in a factory or the like is now increasing. Amongst these, in a case where a work object (workpiece) of which position and orientation is not constant at all times is handled by a robot, a unit for measuring a position and orientation of the work object is required, and a visual sensor is generally often used as the unit.

However, in a case where the position/orientation of the work object is three-dimensionally indeterminate, a normal camera is lacking in information, and thus an attempt to incorporate a sensor for acquiring three-dimensional information into the apparatus is performed. Besides, in the field of factory automation (FA), there is a demand for measuring the position/orientation of the work object with higher precision and at higher speed, and thus three-dimensional precision measurement technology has become important. The three-dimensional measurement technology includes a light-section method, a stereo method, a time-of-flight (TOF) method, and so forth.

The light-section method is a technique for obtaining three-dimensional information of an object by performing triangulation with the combination of a camera and a slit light projector. This technique enables users to easily obtain three-dimensional information about textureless objects, and has come to be utilized also for industrial robots. The stereo method is a technique for obtaining three-dimensional information by preparing two or more sets of cameras and using a principle of the triangulation from parallax between images. The TOF method is an abbreviation for time of flight, and is a technique for measuring distances by irradiating a target object with light from a light-emitting diode (LED) light source and receiving its reflected light with a sensor (light-receiving unit) and measuring the time.

Then, when handling a work object with a robot, since data (dimensions and computer-aided design (CAD) data) of the work object is often known, there is a method for performing positional measurement by comparing and matching between information obtained with a visual sensor and data. In order to perform position/orientation measurements with higher precision, a technique for using in combination the above-described three-dimensional measurement technology and three-dimensional model fitting using CAD data and the like is also utilized.

Japanese Patent Application Laid-Open No. 09-212643 discusses a three-dimensional model fitting between a measurement object and a model of the measurement object, using feature portions extracted from a captured image of the measurement object. The three-dimensional model fitting is a technique for acquiring a position and/or orientation of the measurement object by matching a feature portion of the measurement object acquired from the captured image with a feature portion of a three-dimensional model that simulates the measurement object. The three-dimensional model fitting is widely used as a technique for obtaining the position and/or orientation of the measurement object from the captured image. However, a settable range for the position and/or orientation of the three-dimensional model at the time of matching between the feature portions is wide, and thus generally huge amounts of computation time are needed by a computer for performing the three-dimensional model fitting.

SUMMARY OF INVENTION

The present invention is directed to an information processing apparatus that can reduce computation time used by a computer when comparing a position and/or orientation of a measurement object with that of a model of the measurement object.

According to an aspect of the present invention, an information processing apparatus for matching a position and/or orientation of a measurement object with that of a model of the measurement object includes an acquisition unit configured to acquire a captured image of the measurement object, a calculation unit configured to calculate information indicating a surface shape of the measurement object based on the captured image, and a limitation unit configured to limit a position and/or orientation of the model based on the information indicating the surface shape.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

DESCRIPTION OF EMBODIMENTS

Various exemplary embodiments, features, and aspects of the invention will be described in detail below with reference to the drawings.

Figure 1:
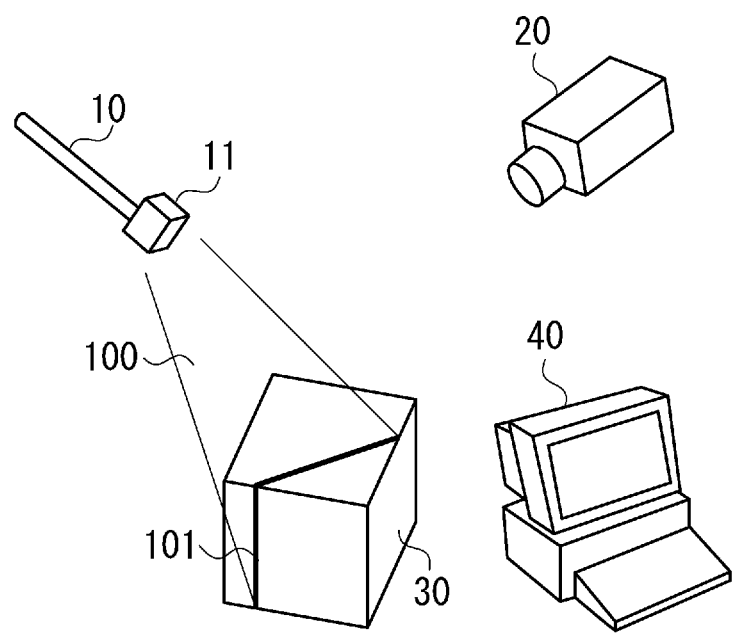
FIG. 1 illustrates a configuration of an information processing apparatus according to a first exemplary embodiment of the present invention.

FIG. 1 illustrates a configuration of an information processing apparatus according to a first exemplary embodiment of the present invention.

A slit laser light projector 10 projects a slit light beam by a laser as pattern light. A light scanning portion 11 is arranged in front of the slit laser light projector 10. The light scanning portion 11 includes a movable type galvano-mirror or polygonal mirror, and is designed to change a light projection angle of the laser slit light according to a control command from the outside. A camera 20 is capable of capturing an image of a predetermined work area. A captured image obtained with the camera 20 is obtained as an image with lens aberration being removed by a publicly known calibration technique. A measurement object 30 is arranged in a predetermined work area and becomes an imaging target by the camera 20. The measurement object 30 is, for example, a work object of a robot within a factory, and it is necessary to calculate a position/orientation thereof for performing works by the robot.

A computer 40 is connected to the light scanning portion 11 and the camera 20, and performs respective control operations and image processing. The computer 40 has a similar configuration to that of a general-purpose personal computer including a central processing unit (CPU), a temporary storage unit such as a random access memory (RAM), and a storage unit such as a ROM (read-only memory). In the storage unit, there are stored computer programs including a scan control program for controlling the light scanning portion 11, an imaging control program for controlling an image capture of the camera 20, an image processing program for performing image processing of a captured image acquired by the camera 20. The image processing program includes a calibration program for detecting pattern light from the captured image, a three-dimensional model for calculating a position and/or orientation of the measurement object 30, and a limitation program for limiting a movable range of the three-dimensional model. Further, captured images acquired by the camera 20 and the like are stored in the temporary storage unit.

When the information processing apparatus is operated, the slit laser light projector 10 projects slit light 100 onto the measurement object 30, and if the measurement object 30 is positioned in a light projection direction of the slit light 100, then a light sectioning line 101 is generated on a surface of the measurement object 30. The camera 20 captures an image of the measurement object 30 under the control of the computer 40, and the computer 40 calculates the position and/or orientation of the measurement object 30 using the light sectioning line 101 in the captured image.

Figure 2:
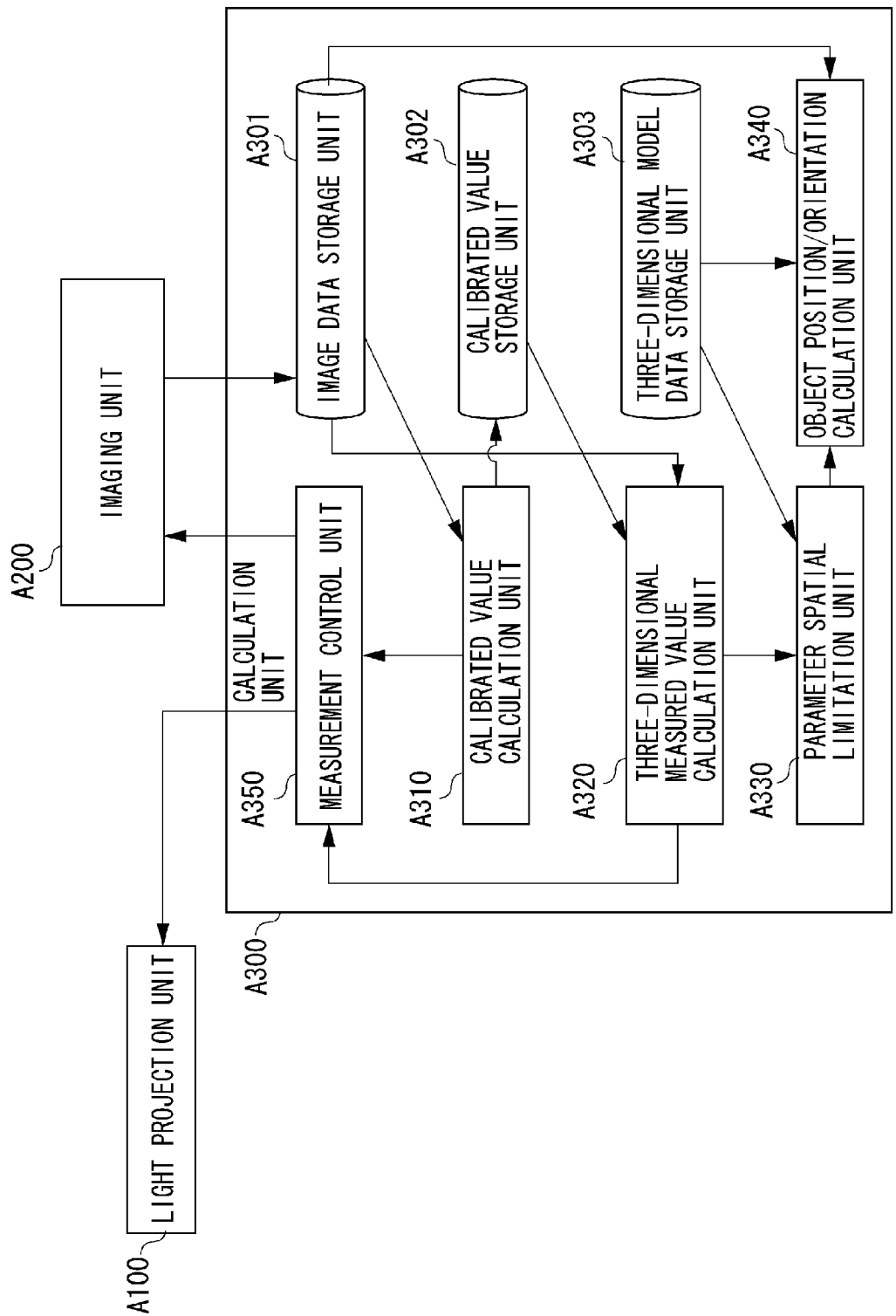
FIG. 2 is a functional configuration diagram in the first exemplary embodiment corresponding to respective components of the apparatus illustrated in FIG. 1.

FIG. 2 is a functional configuration diagram in the present exemplary embodiment corresponding to respective components of the apparatus in FIG. 1. The functional configuration in the present exemplary embodiment will be described below with reference to FIG. 2.

A light projection unit A100 projects the pattern light onto the measurement object 30. The light projection unit A100 corresponds to the slit laser light projector 10. An imaging unit A200 acquires image data of the measurement object 30 and is mounted independently of or in conjunction with the light projection unit A100. The imaging unit A200 corresponds to the camera 20.

A calculation unit A300 performs various calculations, and controls the light projection unit A100 and the imaging unit A200. The calculation unit A300 corresponds to the computer 40. The calculation unit A300 includes a plurality of units as follows.

A measurement control unit A350 as a portion of configuration of the calculation unit A300, acts as a light projection control unit that controls a light projection direction, a light projection intensity, and the like of the light projection unit A100, and as an imaging control unit that controls an imaging operation of the imaging unit A200.

An image data storage unit A301 as a portion of configuration of the calculation unit A300 acts as the acquisition unit that acquires a captured image from the imaging unit A200, and as the storage unit that stores the captured image as data.

A calibrated value calculation unit A310 as a portion of configuration of the calculation unit A300 extracts a region of pattern light (light sectioning line 101) from the captured image stored in the image data storage unit A301.

A calibrated value storage unit A302 as a portion of configuration of the calculation unit A300 acts as the storage unit that stores information about the region of the pattern light calculated by the calibrated value calculation unit A310.

A three-dimensional measured value calculation unit A320 as a portion of configuration of the calculation unit A300 calculates coordinates of the pattern light (coordinate values of respective luminous dot positions on the light sectioning line) using the region of the pattern light stored in the calibrated value storage unit A302. Further, the three-dimensional measured value calculation unit A320 acts as the calculation unit that calculates information (e.g., plane equation) indicating a surface shape of the measurement object 30, using three-dimensional measured values.

A three-dimensional model data storage unit A303 as a portion of configuration of the calculation unit A300 acts as a storage unit that stores three-dimensional model data of the measurement object 30 to be used for calculating the position and/or orientation of the measurement object 30. The three-dimensional model data includes data such as computer graphics, and the position and/or orientation of the measurement object 30 can be determined by performing three-dimensional model fitting with the measurement object 30.

An object position/orientation calculation unit A340 as a portion of configuration of the calculation unit A300 acts as a position/orientation calculation unit that calculates the position and/or orientation of the measurement object 30, by performing three-dimensional model fitting using three-dimensional model data.

A parameter spatial limitation unit A330 as a portion of configuration of the calculation unit A300 acts as a limitation unit that limits a movable range of the three-dimensional model when performing the three-dimensional model fitting, using information indicating the surface shape of the measurement object 30.

Next, a processing flow of the information processing apparatus in the present exemplary embodiment will be described with reference to the processing flow in FIG. 3.

Step S100 is a starting step of the processing by the information processing apparatus. Step S110 is an image data acquisition step in which the light projection unit A100 projects the pattern light onto the measurement object 30, and the imaging unit A200 acquires the captured image of the measurement object 30. The processing in the present step, as described above, is performed by the measurement control unit A350 by sending control signals to the light projection unit A100 and the imaging unit A200. Data of the captured image acquired by the imaging unit A200 is sent to and stored in the image data storage unit A301.

Step S120 is a three-dimensional measuring step for extracting the region of the pattern light from the captured image stored in the image data storage unit A301, and for calculating coordinate values of respective luminous dots on the light sectioning line from the extracted region of the pattern light. The processing in the present step, as described above, is performed by the calibrated value calculation unit A310 and the three-dimensional measured value calculation unit A320.

Figure 5:
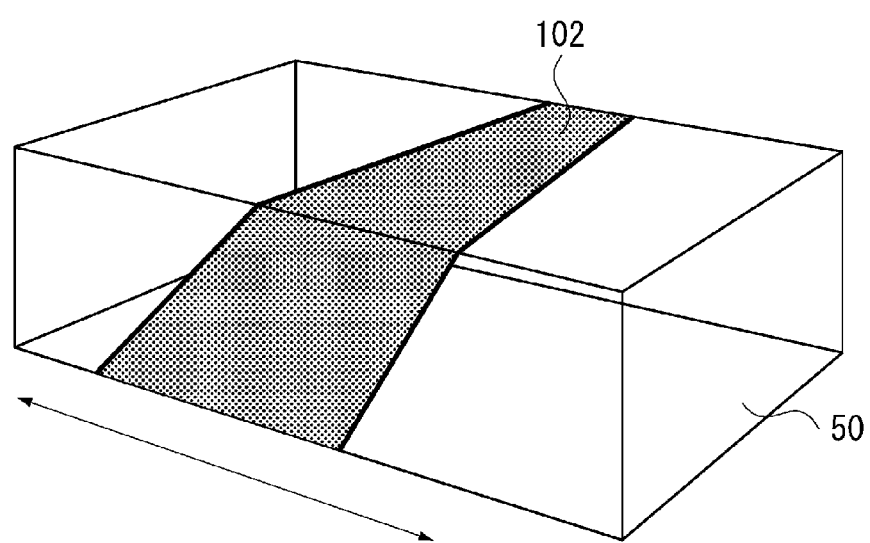
FIG. 5 illustrates a scene of a parameter spatial limitation.

Step S130 is a measurement object surface estimating step for determining information (plane equation or curved surface equation) indicating the surface shape of the measurement object on which the pattern light is irradiated, using the coordinate values calculated in step S120. More specifically, the measurement object surface estimating step is to perform clustering or segmentation of three-dimensional information obtained in the three-dimensional measuring step S120, and to estimate the plane equation (normal vector and irradiated plane) of a surface portion of the measurement object 30 being irradiated. A method for clustering and segmentation may be implemented by comparing neighbors one another using three-dimensional information obtained in the three-dimensional measuring step S120 and performing expansion processing, or may be achieved by performing clustering in advance on images obtained in the image data acquisition step S110. Specifically, straight line detection is performed through Hough transform or the like, and light sectioning lines having the same slope or luminance gradient, or luminous dot positions on the light sectioning line are detected beforehand. Then, a plane equation is estimated by using a least-squares method or the like by using only luminous dot positions on the light sectioning line which belongs to the same class. In the case of FIG. 5, the measurement object surface 102 becomes the range cut by the light sectioning lines 101 and edges of the measurement object from estimated plane which has been obtained. The processing in the present step, as described above, is performed by the three-dimensional measured value calculation unit A320.

Step S140 is a parameter spatial liming step for limiting the movable range of the three-dimensional model when performing the three-dimensional model fitting by the object position/orientation calculation unit A340, using information indicating the surface shape calculated in step S130. More specifically, a plane obtained in the measurement object surface estimating step S130 is formed on world coordinates, and the position/orientation of the three-dimensional model stored in the three-dimensional model data storage unit A303 is changed.

Then, the position/orientation of the three-dimensional model which causes the plane and a plane of the three-dimensional model to match each other is rendered to be a parameter search range (constraint condition) within a parameter space (See FIG. 5). By causing a surface corresponding to an irradiated portion on the three-dimensional model to match with an irradiated surface, and changing a position of the three-dimensional model by planar constraint, there is calculated the range where points on contour lines (light sectioning lines) of the irradiated plane exist within a surface with which the three-dimensional model matches.

Normally, the position/orientation of the three-dimensional model are determined based on six degrees of freedom. However, in the case where a movement range of the three-dimensional model is limited onto a plane according to the present step, it becomes possible to determine the movement range based on three degrees of freedom consisting of a parallel movement of two directions on the plane and rotation. Namely, according to the present step, it becomes possible to significantly shorten a computation time used by a computer when performing the three-dimensional model fitting, by limiting the movable range of the three-dimensional model. The processing in the present step, as described above, is carried out by the parameter spatial limitation unit A330.

Step S150 is an object position/orientation calculating step for performing three-dimensional model fitting based on three-dimensional model data stored in the three-dimensional model data storage unit A303. More specifically, the object position/orientation calculating step is for performing optimization calculation (parameter extraction performed such that a mean squared error of position/orientation parameters becomes minimal) in a parameter space obtained in the parameter spatial limiting step S140, and calculating position/orientation parameters of a final three-dimensional model. In the case where a plurality of search ranges exist within the parameter space obtained in the parameter spatial limiting step S140, optimization calculations are performed in all partial spaces. Then, finally an error which becomes the smallest amongst errors between the three-dimensional model on image coordinates and position/orientation parameters of the measurement object being projected onto an image is assumed to be a correct solution value. In the case of FIG. 5, since the three-dimensional model undergoes planar constraint by a plane obtained in the measurement object surface estimating step S130, an image Jacobian in the planar constraint is derived as follows. Initial values of the position/orientation parameters of the three-dimensional model each are selected within the limited parameter space. The processing in the present step, as described above, is carried out by the object position/orientation calculation unit A340.

Step S160 is a termination step of the processing by the information processing apparatus.

Next, a calibration method in the present exemplary embodiment will be described.

It is assumed that an arbitrary point $X=[X,Y,Z]^T$ in the world coordinate system is transformed into a point $x=[X,Y,$ $Z]^T$ on the normalized image coordinate system through coordinate transformation via a projection matrix .alpha. At this time, a corresponding point $u=[u, v]^T$ of X in the image coordinate system is expressed as follows:

[Math. 1]

$$u' = \frac{1}{z}x = \frac{1}{z}\alpha X' \qquad (1)$$

where u' and X' are homogeneous coordinates letting scale factors of u and X be 1, and each is expressed as $u'=[u, v, 1]^T$, $X'=[X, Y, Z, 1]^T$. The projection matrix .alpha. is a 3×4 matrix, and can be determined from equation (1) as a linear equation by shooting six or more points of which world coordinates are known, and measuring their projected positions.

Further, an equation of the slit light plane can be determined by calculating a three-dimensional position using the projection matrix .alpha., by irradiating the slit light onto a jig of which coordinate values in the world coordinate system are known in advance, and measuring their irradiation position on the image. In the present exemplary embodiment, since irradiation angles of the slit light are designed to be changed by the light scanning portion 11, it is necessary to determine an equation for slit light plane at each irradiation angle. One scan is implemented with K light sectioning lines, and let a slit light irradiation angle from an original point position of the light scanning portion 11 for obtaining the k-th light sectioning line be .capital phi.k. K and .capital phi.1 to .capital phi.K are fixed values to be predefined, and the same values are assumed to be used at the time of calibration and at the time of actual work. The equation of the slit light plane is expressed as follows:

[Math.2]

$$A_k X + B_k Y + C_k Z + D_k = 0 \quad (k=1,2,\ldots,K) \qquad (2)$$

In an actual three-dimensional measurement, the k-th light sectioning line is obtained on the image coordinates by irradiating the measurement object with the slit light beam. From a luminous dot position $u''=[u'',v'',1]^T$ on the light sectioning line, a luminous dot position $X'_i=[X'_i, Y'_i, Z'_i, 1]^T$ on the light sectioning line in the world coordinate system is expressed as follows:

[Math.3]

$$X'_i = z(\alpha^T \alpha)^{-1}\alpha^T u'' \qquad (3)$$

By substituting equation (2) into the slit light plane equation of the corresponding equation (3), an irradiation position $X'_i$ in the world coordinate system can be determined.

Figure 6:
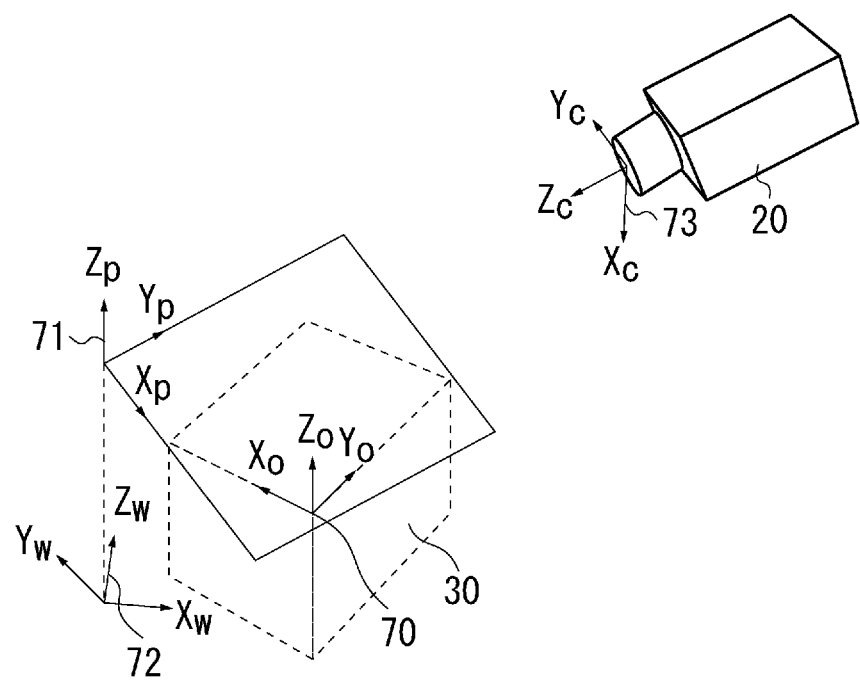
FIG. 6 illustrates a coordinate system to be defined in the first exemplary embodiment.

Next, specific processing of the three-dimensional model fitting in the present exemplary embodiment will be described below. First, the coordinate systems are defined as illustrated in FIG. 6. The coordinate systems include a three-dimensional model coordinate system 70, a plane coordinate system 71 letting constrained plane be the XY plane, and normal vector of the plane be the Z-axis, a world coordinate system 72, and a camera coordinate system 73. Though not illustrated in FIG. 6, the image coordinate system also exists.

An arbitrary plane in the three-dimensional space can be defined by a vector (normal vector) orthogonal to the plane, and a signed distance from the original point of the world coordinate system to the plane. The degree of freedom of the normal vector normalized by a length 1 is 2, and the degree of freedom of the signed distance is 1, the plane is represented based on three degrees of freedom.

In this process, the normal vector of the plane is defined with respect to the world coordinate axis. The world coordinate system is .phi. rotated about the y-axis of the world coordinate system, and is .phi. rotated about x-axis of the world coordinate axis after the rotation. Assuming that the normal vector of the plane be the z-axis after the rotation at that time, a rotation matrix Rwp representing an orientation of the plane is expressed as equation (4).

[Math. 4]

$$R_{wp} = \begin{bmatrix} \cos\theta & 0 & \sin\theta \\ \sin\theta\sin\phi & \cos\phi & -\cos\theta\sin\phi \\ -\sin\theta\cos\phi & \sin\phi & \cos\theta\cos\phi \end{bmatrix} \qquad (4)$$

Then, a normal vector n is expressed as equation (5).
[Math.5]

$$n=[\sin\theta, -\cos\theta\sin\phi, \cos\theta\cos\phi]^t \qquad (5)$$

Then, when representing the signed distance as r, assuming that the normal vector n as a direction vector be a point of intersection between a straight line passing through the original point of the world coordinate system and the plane, the original point $T_{wp}$ of the plane coordinate system is expressed in the following equation.
[Math.6]

$$T_{wp} = rn \qquad (6)$$

Now, put a position in the coordinate system of the three-dimensional model of a certain point r as $r_o=[x_o, y_o, z_o]^T$, and a position in the plane coordinate system of the point be $r_p=[x_p, y_p, z_p]^T$. Relationship between $r_o$ and $r_p$ is represented by a rotation .alpha. about the normal vector of the plane and a translational motion as follows.

[Math. 7]

$$r_p = \begin{bmatrix} x_p \\ y_p \\ z_p \end{bmatrix} = \begin{bmatrix} \cos\alpha & -\sin\alpha & 0 \\ \sin\alpha & \cos\alpha & 0 \\ 0 & 0 & 1 \end{bmatrix}\begin{bmatrix} x_o \\ y_o \\ z_0 \end{bmatrix} + \begin{bmatrix} t^x_{po} \\ t^y_{po} \\ 0 \end{bmatrix} \qquad (7)$$

Similarly, if a position in the world coordinate system of a point r is put as $r_w=[x_w, y_w, z_w]^T$, a relationship between $r_p$ and $r_w$ can be expressed using $R_{wp}$ and $T_{wp}$ as follows.

[Math. 8]

$$r_w = R_{wp}\begin{bmatrix} x_p \\ y_p \\ 0 \end{bmatrix} + T_{wp} \qquad (8)$$

Next, let a position in the camera coordinate system of the point r be $r_c=[x_c, y_c, z_c]^T$, then transformation from $r_w$ to $r_c$ is given as follows:

[Math. 9]

$$r_c = \begin{bmatrix} x_c \\ y_c \\ z_c \end{bmatrix} = R_{cw}\begin{bmatrix} x_w \\ y_w \\ z_w \end{bmatrix} + \tau_{cw} \qquad (9)$$

Hence, a position u of the point r in the image coordinate system is given as follows:

[Math. 10]

$$u = \begin{bmatrix} u \\ v \end{bmatrix} = \begin{bmatrix} -\frac{x_c}{z_c} \\ -\frac{y_c}{z_c} \end{bmatrix} \quad (10)$$

The image Jacobian is calculated using equations (7), (8), (9), and (10) as follows. Rotation on the plane (about normal) .alpha.

[Math. 11]

$$\frac{\partial u}{\partial \alpha} = \begin{bmatrix} \frac{\partial u}{\partial \alpha} \\ \frac{\partial v}{\partial \alpha} \end{bmatrix} = \frac{\partial u}{\partial x_c} \cdot \frac{\partial x_c}{\partial x_w} \cdot \frac{\partial x_w}{\partial x_p} \cdot \frac{\partial x_p}{\partial \alpha} \quad (11)$$

Translational motion $t_{po}$ on the plane is given as follows:

[Math. 12]

$$\frac{\partial u}{\partial t_{po}^x} = \begin{bmatrix} \frac{\partial u}{\partial t_p^x} \\ \frac{\partial v}{\partial t_p^x} \end{bmatrix} = \frac{\partial u}{\partial x_c} \cdot \frac{\partial x_c}{\partial x_w} \cdot \frac{\partial x_w}{\partial x_p} \cdot \frac{\partial x_p}{\partial t_{po}^x}$$

$$\frac{\partial u}{\partial t_{po}^y} = \begin{bmatrix} \frac{\partial u}{\partial t_p^y} \\ \frac{\partial v}{\partial t_p^y} \end{bmatrix} = \frac{\partial u}{\partial x_c} \cdot \frac{\partial x_c}{\partial x_w} \cdot \frac{\partial x_w}{\partial x_p} \cdot \frac{\partial x_p}{\partial t_{po}^y} \quad (12)$$

In the case of FIG. 5, since it is only necessary to consider the translational motion of one axis on the plane, only .delta.u/.delta.$t_{po}^X$ is used. This case becomes the three-dimensional model fitting which is constrained to a straight line on the three-dimensional space.

Next, an optimization algorithm on an image using the derived image Jacobian will be given. In the present exemplary embodiment, the three-dimensional model fitting of an edge base is performed.

Figure 7:
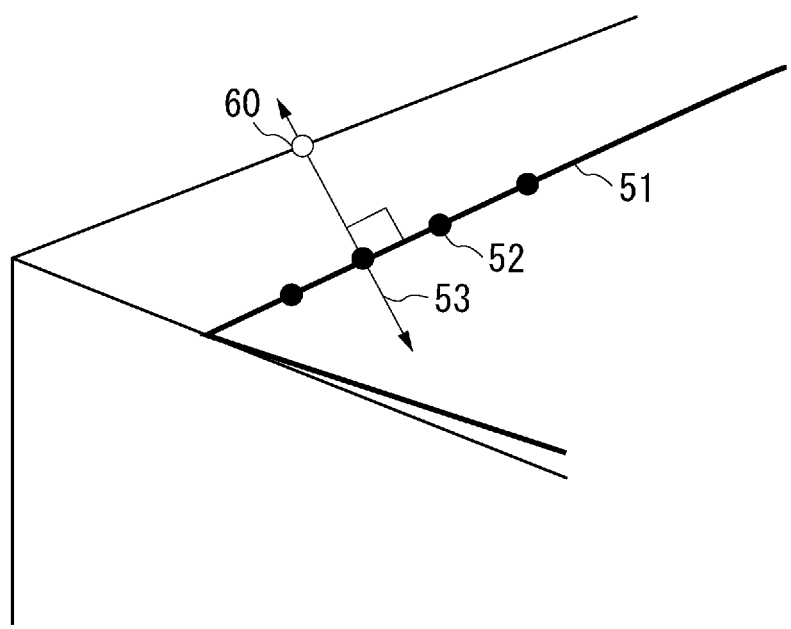
FIG. 7 illustrates a scene of a three-dimensional model fitting of edge base.

As illustrated in FIG. 7, in the three-dimensional model fitting of the edge base, processing is performed in each dividing point at which each edge of a model is divided at equal interval. The processing is performed on the image plane by projecting the three-dimensional model onto the image plane. In each of the dividing points 52, an edge of the measurement object is searched on a line segment (hereinafter, a search line 53), which is vertical to each projection line 51 of the three-dimensional model and passes through the dividing point. When processing is completed for all of the dividing points, the position and orientation of the three-dimensional model are calculated. In this process, let a total number of corresponding points which can establish correspondence among the dividing points be NC. The position and orientation of the three-dimensional model are calculated by making corrections based on repeated calculations.

Figure 8:
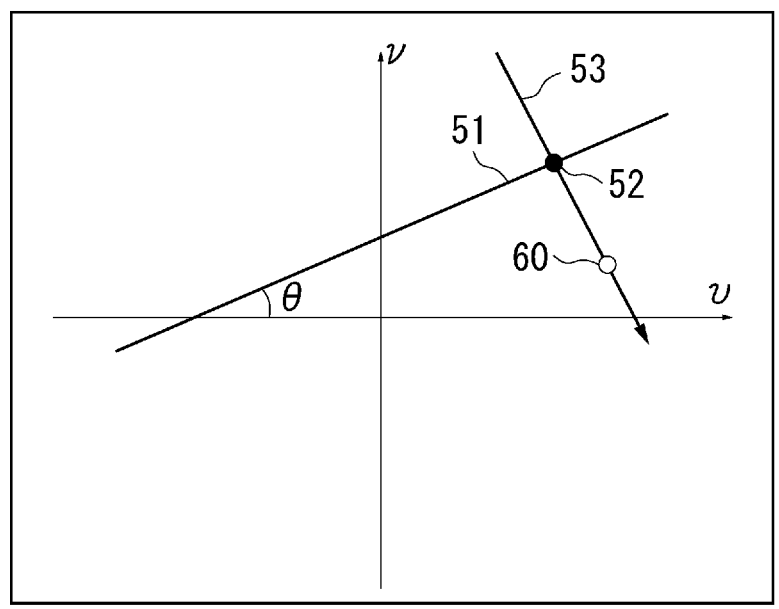
FIG. 8 illustrates a method for calculating position/orientation parameters of the three-dimensional model by utilizing information of line segments.

Next, a method for calculating a position and orientation of a three-dimensional model by utilizing information about line segments (edges) will be described below. FIG. 8 illustrates a method for calculating the position and orientation of the three-dimensional model by utilizing information about line segments.

In FIG. 8, the horizontal direction of an image is taken as u-axis, and the vertical direction is taken as v-axis. Coordinates of a certain dividing point 52 are represented by ($u_k$, $v_k$), and a slope of a line segment 51 to which the dividing point belongs on the image is represented by a slope .theta. relative to the u-axis. Besides, let a normal vector of the line segment 51 be (sin.theta.−cos.theta.). Moreover, let coordinates of the corresponding point 60 which is present on an edge of the measurement object relative to the dividing point 52 be ($u'_k$, $v'_k$).

Now, a distance from the dividing point 52 to the corresponding point 60 is calculated. A point (u, v) on the line segment 51 satisfies equation (13).

$$u \sin\theta - v \cos\theta = r \quad (13)$$

where $$r = u_k \sin\theta - v_k \cos\theta \text{ .(constant)} \quad (14)$$

The point (u, v) on the straight line which passes through the corresponding point 60 and is parallel to the line segment 51 satisfies equation (15).

$$u \sin\theta - v \cos\theta = d \quad (15)$$

where $$d = u'_k \sin\theta - v'_k \cos\theta \text{ .(constant)} \quad (16)$$

Hence, a distance from the dividing point 52 to the corresponding point 60 is calculated as d−r. Coordinate values in the image coordinate system of the corresponding point 60 are a function of the position/orientation of the three-dimensional model. The degree of freedom of the position/orientation of the three-dimensional model is six degrees of freedom. In this case, a parameter for representing the position and orientation of the three-dimensional model is represented as "p". The "p" is six-dimensional vector, which consists of three factors which represent a position of the three-dimensional model, and three factors which represent orientation thereof. The three factors which represent the orientation are represented by, for example, representation by an Euler angle, or a three-dimensional vector in which a direction represents a rotation axis and a magnitude represents a rotation angle.

In the case of FIG. 5, although it is only necessary to perform fitting by moving the three-dimensional model only in the X-axis direction in the plane coordinate system in the planar constraint, herein the three-dimensional fitting using an edge for six degrees of freedom will be described. When (u, v) are approximated by Taylor expansion of the first order in the vicinity of ($u_k$, $v_k$), assuming (u, v) to be coordinates in the image coordinate system of the dividing point 52, they are expressed as given in equation (17).

[Math. 13]

$$u \approx u_k + \sum_{i=1}^{6} \frac{\partial u}{\partial p_i} \Delta p_i, \quad v \approx v_k + \sum_{i=1}^{6} \frac{\partial v}{\partial p_i} \Delta p_i \quad (17)$$

In equation (17), partial differential coefficients .delta.u/.delta.$p_i$ and .delta.v/.delta.$p_i$ are image Jacobians.

A correction value .capital delta.p of position/orientation parameter "p" of the three-dimensional model is calculated so that (u, v) expressed by equation (17) exist on the straight line which is expressed by equation (15). Substituting equation (17) into equation (15) yields equation (18).

[Math. 14]

$$\left(u_k + \sum_{i=1}^{6} \frac{\partial u}{\partial p_i}\Delta p_i\right)\sin\theta - \left(v_k + \sum_{i=1}^{6} \frac{\partial v}{\partial p_i}\Delta p_i\right)\cos\theta = d \quad (18)$$

If equation (18) is rearranged, it is expressed as equation (19).

[Math. 15]

$$\sin\theta \sum_{i=1}^{6} \frac{\partial u}{\partial p_i}\Delta p_i - \cos\theta \sum_{i=1}^{6} \frac{\partial v}{\partial p_i}\Delta p_i = d - r \quad (19)$$

Since equation (19) holds for NC dividing points, a linear simultaneous equation holds for .capital delta.p as shown in equation (20).

[Math. 16]

$$\begin{bmatrix} \sin\theta_1 \frac{\partial u_1}{\partial p_1} - \cos\theta_1 \frac{\partial v_1}{\partial p_1} & \sin\theta_1 \frac{\partial u_1}{\partial p_2} - \cos\theta_1 \frac{\partial v_1}{\partial p_2} & \cdots & \sin\theta_1 \frac{\partial u_1}{\partial p_6} - \cos\theta_1 \frac{\partial v_1}{\partial p_6} \\ \sin\theta_2 \frac{\partial u_2}{\partial p_1} - \cos\theta_1 \frac{\partial v_2}{\partial p_1} & \sin\theta_2 \frac{\partial u_2}{\partial p_2} - \cos\theta_1 \frac{\partial v_2}{\partial p_2} & \cdots & \sin\theta_2 \frac{\partial u_2}{\partial p_6} - \cos\theta_1 \frac{\partial v_2}{\partial p_6} \\ \vdots & \vdots & \ddots & \vdots \\ \sin\theta_{N_c} \frac{\partial u_{N_c}}{\partial p_1} - \cos\theta_{N_c} \frac{\partial v_{N_c}}{\partial p_1} & \sin\theta_{N_c} \frac{\partial u_{N_c}}{\partial p_2} - \cos\theta_{N_c} \frac{\partial v_{N_c}}{\partial p_2} & \cdots & \sin\theta_{N_c} \frac{\partial u_{N_c}}{\partial p_6} - \cos\theta_{N_c} \frac{\partial v_{N_c}}{\partial p_6} \end{bmatrix} \begin{bmatrix} \Delta p_1 \\ \Delta p_2 \\ \Delta p_3 \\ \Delta p_4 \\ \Delta p_5 \\ \Delta p_6 \end{bmatrix} = \begin{bmatrix} d_1 - r_1 \\ d_2 - r_2 \\ \vdots \\ d_{N-c} - r_{N_c} \end{bmatrix} \quad (20)$$

At this time, equation (20) is simply expressed as equation (21).

$$J.\text{capital delta}.p = E \quad (21)$$

From equation (21), J.capital delta.p is determined using generalized inverse matrix $(JT/J)^{-1}$ of matrix. However, in the present exemplary embodiment, since it is possible to resolve itself into a one-degree of freedom issue, it is only necessary to calculate only .capital delta.p1, regarding as $p_1 = t^{x}_{po}$. Repeated calculations are performed until .capital delta.p1 finally becomes equal to or smaller than a threshold value.

Figure 9:
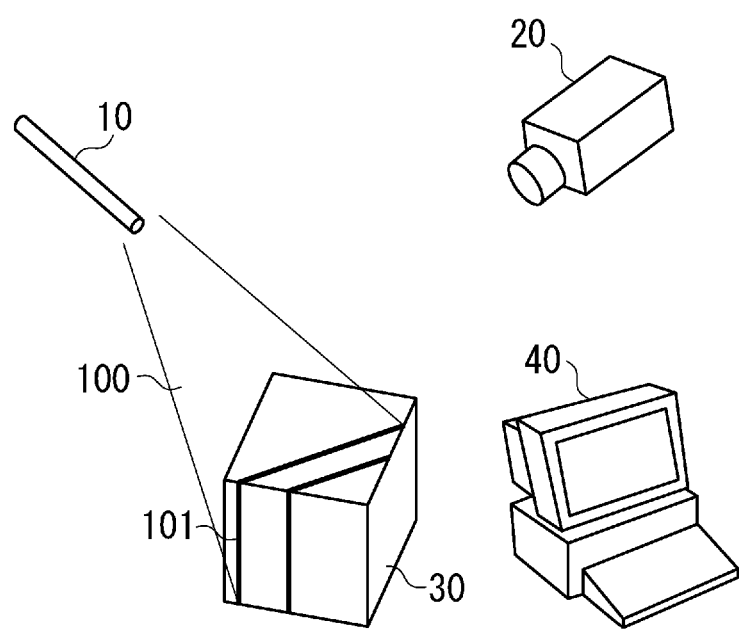
FIG. 9 illustrates a configuration of an information processing apparatus according to a second exemplary embodiment of the present invention.

A Basic configuration in a second exemplary embodiment of the present invention is similar to that in the first exemplary embodiment. A point different from the first exemplary embodiment, as illustrated in FIG. 9, is to use a multi-slit laser light projector as the slit laser light projector 10. The slit laser light projector 10 is a laser light projector capable of emitting a plurality of slit light beams (multi-slit illumination light) at one time, and it becomes possible to extract a plurality of light sectioning lines from the captured image. A plurality of light sectioning lines can be extracted from a frame of the captured image, so that the number of captured images to be acquired can be reduced, and thus a processing time can be further shortened.

A calibration method in the present exemplary embodiment will be described below. An equation of the multi-slit light plane can be each determined by irradiating a jig, of which coordinate values in the world coordinate system are known in advance, with the multi-slit light, measuring irradiation positions thereof on an image, and calculating a three-dimensional position using the projection matrix .alpha. If the number of slits of the multi-slit light is assumed to be K, and the k-th slit light irradiation angle from the original point position of the light scanning portion 11 to be .capital phi.k, the equation of the multi-slit light plane is expressed similarly to that in the first exemplary embodiment.

Actual processing is performed similar to the first exemplary embodiment, according to the flow in FIG. 2. However, in the three-dimensional measuring step S120, thanks to the multi-slit light, three-dimensional information necessary for estimating an irradiation plane by one time measurement can be obtained. Further, it is necessary to discriminate by which slit light each of the light sectioning lines is depicted on the measurement object. Each of the light sectioning lines is obtained on the image. For example, there is a method for discrimination by performing primary scanning in the vertical direction of a certain extracted light sectioning line, extracting all of K slit light beams, and labeling them in sequence.

An apparatus configuration in a third exemplary embodiment of the present invention is similar to that in the first exemplary embodiment. The third exemplary embodiment differs from the first exemplary embodiment in that light projection of the light projection unit A100 is changed (second pattern light), if it is determined that information of first pattern light in a first direction is not enough to enable performing adequate constraint of parameters by the parameter spatial limiting step. Then, again, the parameter spatial limiting step is to be performed. It becomes possible to determine more highly precisely the position and orientation of the measurement object 30 by repeating the above-described step until adequate parameter constraint can be executed.

Figure 10:
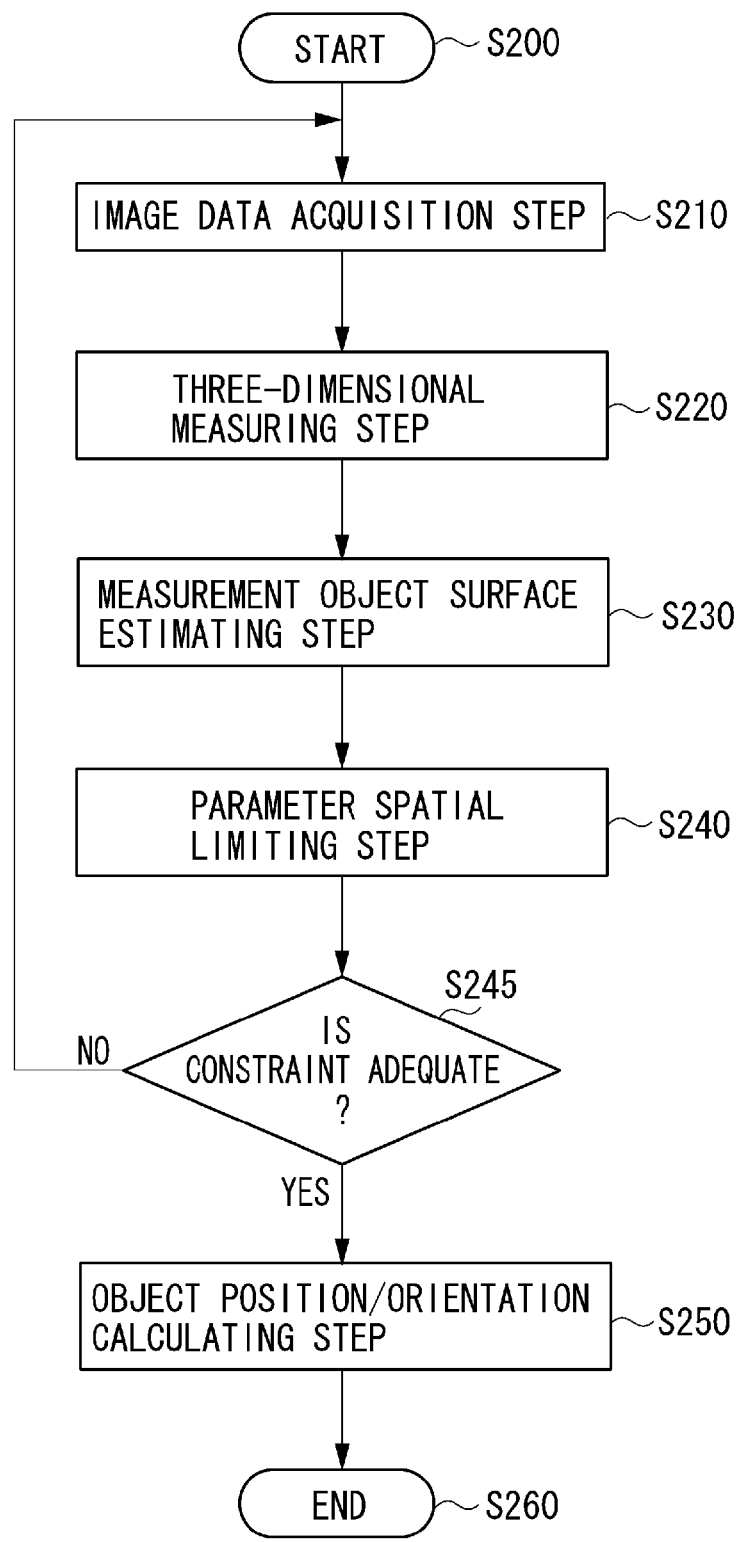
FIG. 10 illustrates a processing flow in a third exemplary embodiment of the present invention.

Actual work in the present exemplary embodiment is conducted according to the flow in FIG. 10. The image data acquisition step S210 through the parameter spatial limiting step S240 perform processing similar to the image data acquisition step S110 through the parameter spatial limiting step S140 in the first exemplary embodiment.

Figure 11:
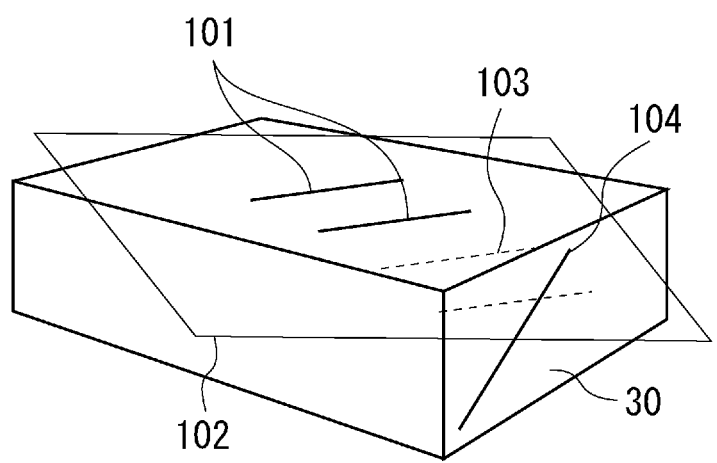
FIG. 11 illustrates a case where adequate parameter constraint cannot be performed in the third exemplary embodiment.

In step S245, it is discriminated whether a measurement result by the first captured image enables adequate parameter space constraint to be executed when executing three-dimensional model fitting. For example, in a case where two light sectioning lines 101 have been obtained as illustrated in FIG. 11, although an irradiation surface 102 (first surface shape) is estimated, a range of position of the three-dimensional model cannot be limited. If adequate parameter space constraint cannot be executed (NO in step S245), the processing returns to the image data acquisition step S210, then the second captured image is acquired by emitting the slit light from another position (second direction) by moving the light projection unit A100 to a position different from the current position. Then, additional irradiated surface (second surface shape) is acquired using the second captured image.

First, there is calculated the light sectioning line in a case where an irradiation angle of the light projection unit 10 is changed to an arbitrary predetermined angle by the light scanning portion 11, from a plane obtained in the measurement object surface estimating step S230. This is calculated in advance by determining a nodal line between the slit light plane of each irradiation angle and the irradiation surface 102 obtained in the measurement object surface estimating step S230. Hereinafter, it is referred to as a virtual light sectioning line 103. Next, irradiation is performed by changing the irradiation angle to the predetermined angle, and then a light sectioning line 104 is obtained.

If matching processing is performed between the virtual light sectioning line 103 and the light sectioning line 104 actually obtained on the image coordinates, and there is a portion where the matching cannot be established, then parameter spatial limitation is performed since there is high possibility that the light sectioning line may be segmented due to light projection beyond a contour of the measurement object. Specifically, similar to the first exemplary embodiment, a surface corresponding to an irradiated portion on the three-dimensional model is caused to match with the irradiation surface, and a range in which points on a contour line (light sectioning line) of the irradiation plane exist within a plane with which the three-dimensional model matches is calculated by changing the position and orientation of the three-dimensional model through the planar constraint. If matching between all of the virtual light sectioning lines 103 and the actually obtained light sectioning line 104 is established, as a result of irradiations at all irradiation angles, the three-dimensional model fitting is performed by deriving the image Jacobians for translational motion in plane direction and rotational motion about a normal vector of the plane. Each image Jacobian has been derived in equation (11) and equation (12). After that, in the object position/orientation calculating step S250, the position/orientation of the measurement object is calculated.

Figure 12:
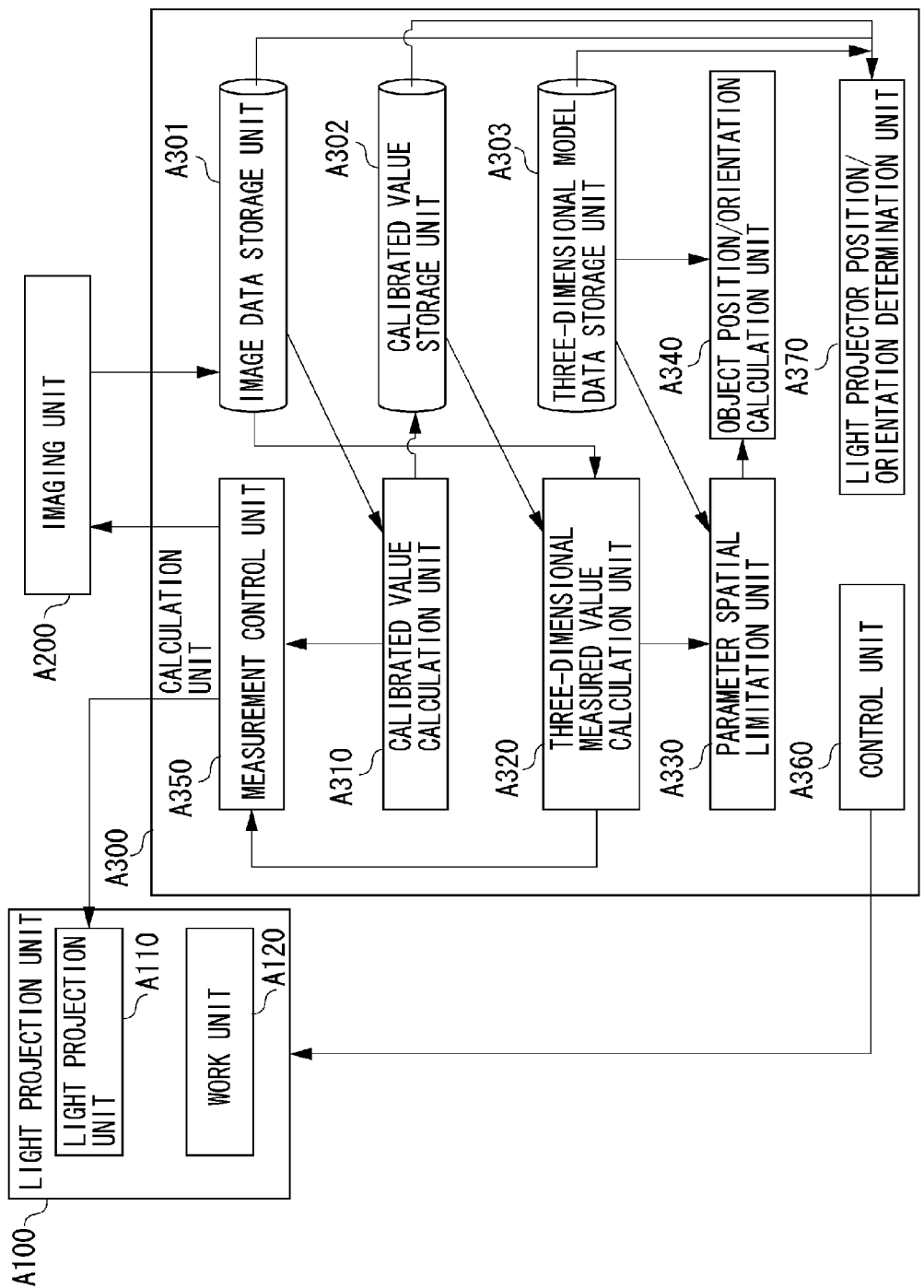
FIG. 12 illustrates a configuration of an information processing apparatus according to a fourth exemplary embodiment of the present invention.

FIG. 12 illustrates a basic configuration in a fourth exemplary embodiment of the present invention.

A light projection unit A100 includes a light projection unit A110 that irradiates the measurement object with pattern light and a work unit A120 that changes a position/orientation of the light projection unit A100. An imaging unit A200 is used for acquiring image data, and is mounted independently of or in conjunction with the light projection unit A100.

A calculation unit A300 conducts various calculations, and includes a calibrated value calculation unit A310, a three-dimensional measured value calculation unit A320, a parameter spatial limitation unit A330, an object position/orientation calculation unit A340, and a measurement control unit A350. In addition, the calculation unit A300 includes a control unit A360, a light projector position/orientation determination unit A370, an image data storage unit A301, a calibrated value storage unit A302, and a three-dimensional model data storage unit A303.

Figure 13:
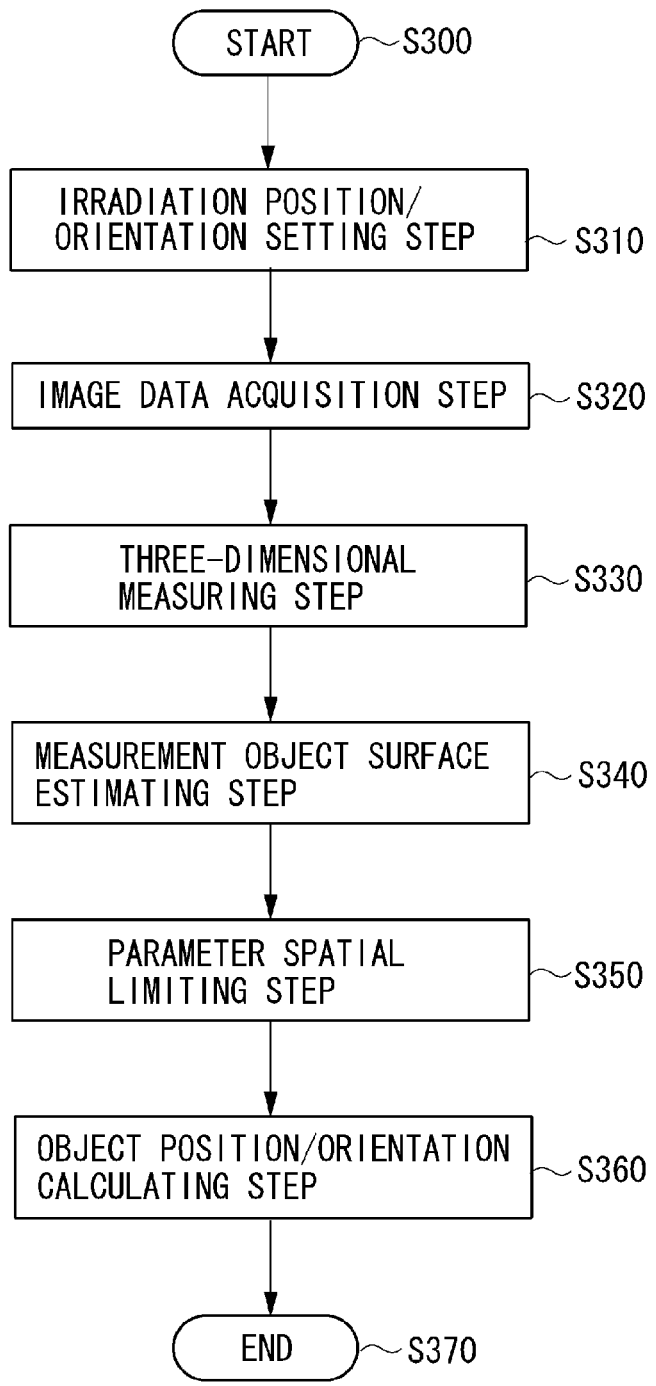
FIG. 13 illustrates a processing flow in the fourth exemplary embodiment.

Actual processing is performed according to the flow in FIG. 13. In the irradiation position/orientation setting step S310, there is determined a position/orientation of the light projection unit A100, which can be moved by the control unit A360 as a movement control unit. From an image acquired by the imaging unit A200 prior to irradiation onto the measurement object 30, the position/orientation of the light projection unit A100 is set in the light projector position/orientation determination unit A370. The image data acquisition step S320 through the object position/orientation calculating step S360 perform processing similar to the image data acquisition step S110 through the object position/orientation calculating step S150 in the first exemplary embodiment.

Figure 14:
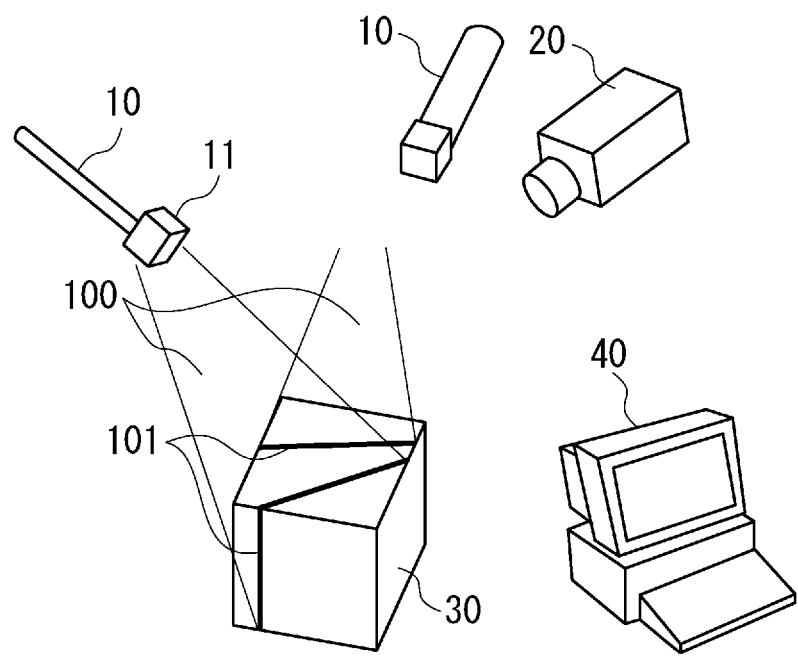
FIG. 14 illustrates a configuration of the information processing apparatus according to the fourth exemplary embodiment.

FIG. 14 illustrates a specific configuration in the present exemplary embodiment. Substantially similar to FIG. 3 illustrating the specific configuration in the first exemplary embodiment, the position/orientation of the light projection unit A110 is set so that it can be changed by the work unit A120 as a light projector movement unit.

Figure 15:
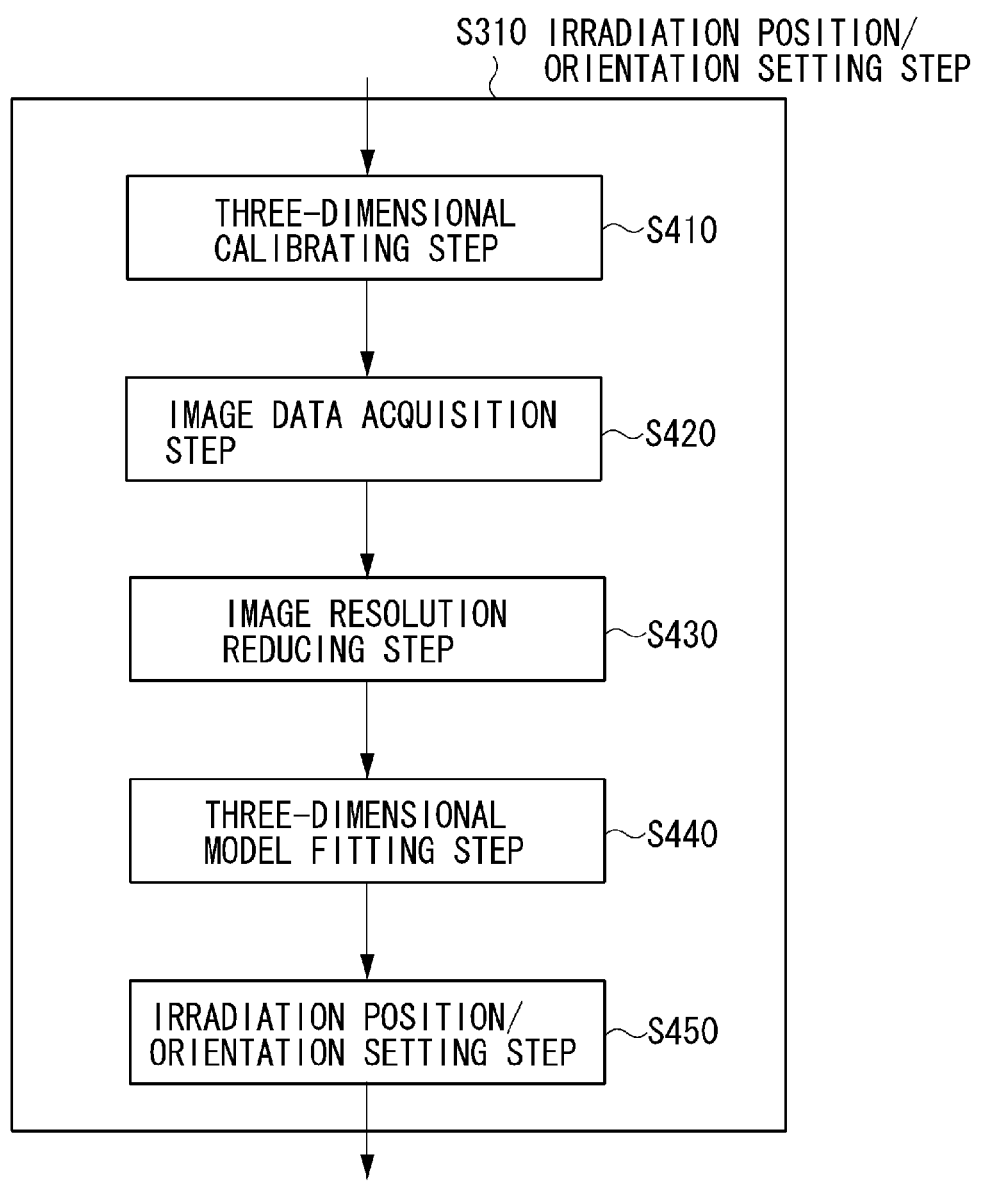
FIG. 15 illustrates a processing flow of an irradiation position/orientation setting step in the fourth exemplary embodiment.

Next, a method for performing the flow of the irradiation position/orientation setting step S310 along the above-described configuration will be specifically described. Processing contents will be specifically described along the flow in FIG. 15.

In a three-dimensional calibrating step S410, three-dimensional calibration has been performed at a predefined candidate position of the position/orientation of the light projection unit A100. The three-dimensional calibration to be performed at each position is similar to that in the first exemplary embodiment. A plane equation estimation function of a light sectioning surface in the case of irradiation from an arbitrary position/orientation is generated using the three-dimensional calibration result. If the position of the light projection unit A100 is put as X, the orientation as "a", the coefficient vector which represents the plane equation of light sectioning surface AX+BY+CZ+D=0 as A=$[A, B, C, D]^T$, then the plane equation estimation function becomes f(X, a)=A. An approximate solution of the plane equation estimation function "f" may be obtained by analyzing a linear function model based on polynomial regression by using the least squares method. In an image data acquisition step S420, image data is acquired by the camera 20.

In an image resolution reducing step S430, the calculation unit A300 acts as a resolution reduction unit, and in the image data acquisition step S420, the calculation unit A300 transforms acquired image into an image with reduced image resolution.

In a three-dimensional model fitting step S440, fitting processing is performed between a reduced resolution image of the measurement object acquired in the image resolution reducing step S430 and a model obtained by simplifying model data being stored in the three-dimensional model data storage unit A303. Then, the position and orientation of the measurement object 30 are roughly estimated. Features used for the fitting processing may be edges or feature points such as, corners, other so-called Key points.

As a specific method, a Random Sample Consensus (RANSAC) method is named. The position/orientation of the three-dimensional model that would correspond to the Key points is estimated by randomly selecting several key points from the reduced resolution image of the measurement object. When the three-dimensional model is projected onto the image coordinates from the estimated position/orientation, if a total sum of distances between non-selected key points of the measurement object 30 and key points of the three-dimensional model which are present closest thereto is equal to or smaller than a threshold value, it is to be a correct solution value. Alternatively, a total sum of distances between edges of the measurement object 30 and a projection line of the three-dimensional model which is present closest thereto may be calculated. If the threshold value is exceeded, returning to the start, key points of the measurement object are randomly selected.

In an irradiation position/orientation setting step S450, the position/orientation of the light projection unit A100 is set so that it can effectively irradiate the measurement object 30 using the position/orientation of the measurement object 30 roughly estimated in the three-dimensional model fitting step S440.

Specifically, the light projection unit A100 is arranged at a position/orientation and performs light projection, where it can irradiate the position/orientation of the measurement object 30 which has been roughly estimated in the three-dimensional model fitting step S440. Specifically, an angle of the light projection unit A100 is determined from the roughly estimated position/orientation of the measurement object, a position/orientation of a camera which captures images, and the required precision at the time of the three-dimensional measurement. A position of the light projection unit A100 is determined from a focal length of the light projector. The light projection unit A100 is moved to the position/orientation using the control unit A360 and the work unit A120, and it irradiates the measurement object. The three-dimensional position is measured by detecting a light sectioning line projected on the measurement object. The position/orientation of the light projection unit A100 is corrected based on a three-dimensional measurement result. In this process, the position/orientation of the light projection unit A100 for absorbing estimation errors of the position/orientation of the measurement object in the three-dimensional model fitting step S440 and for three-dimensionally measuring the measurement object is controlled by the work unit A120.

The image data acquisition step S320 through the object position/orientation calculating step S360 perform similar processing to those in the image data acquisition step S110 through the object position/orientation calculating step S150 in the first exemplary embodiment.

Figure 16:
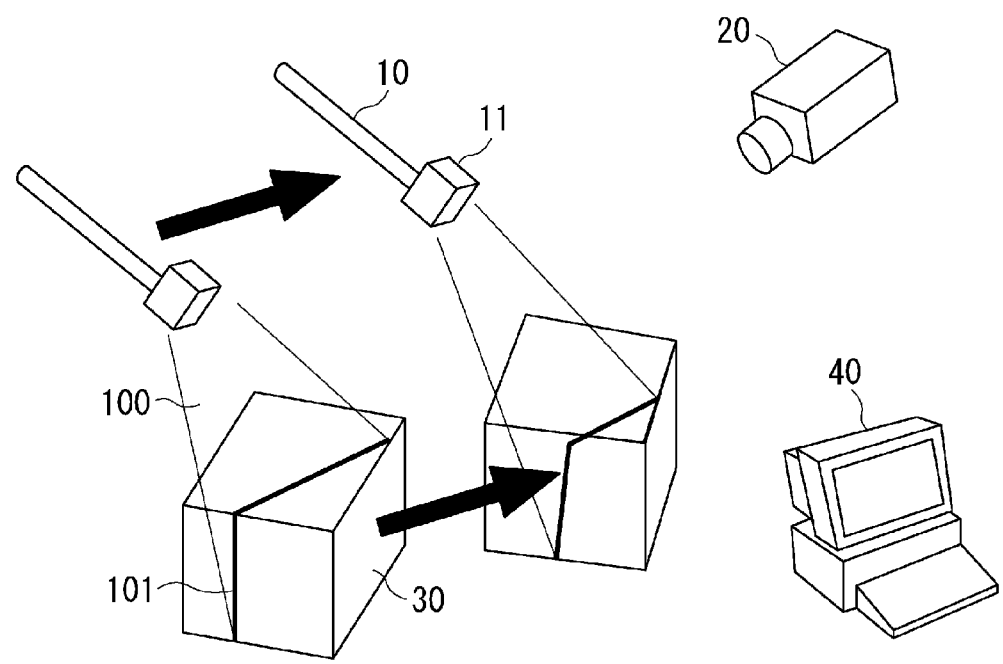
FIG. 16 illustrates a configuration of an information processing apparatus according to a fifth exemplary embodiment of the present invention.
Figure 17:
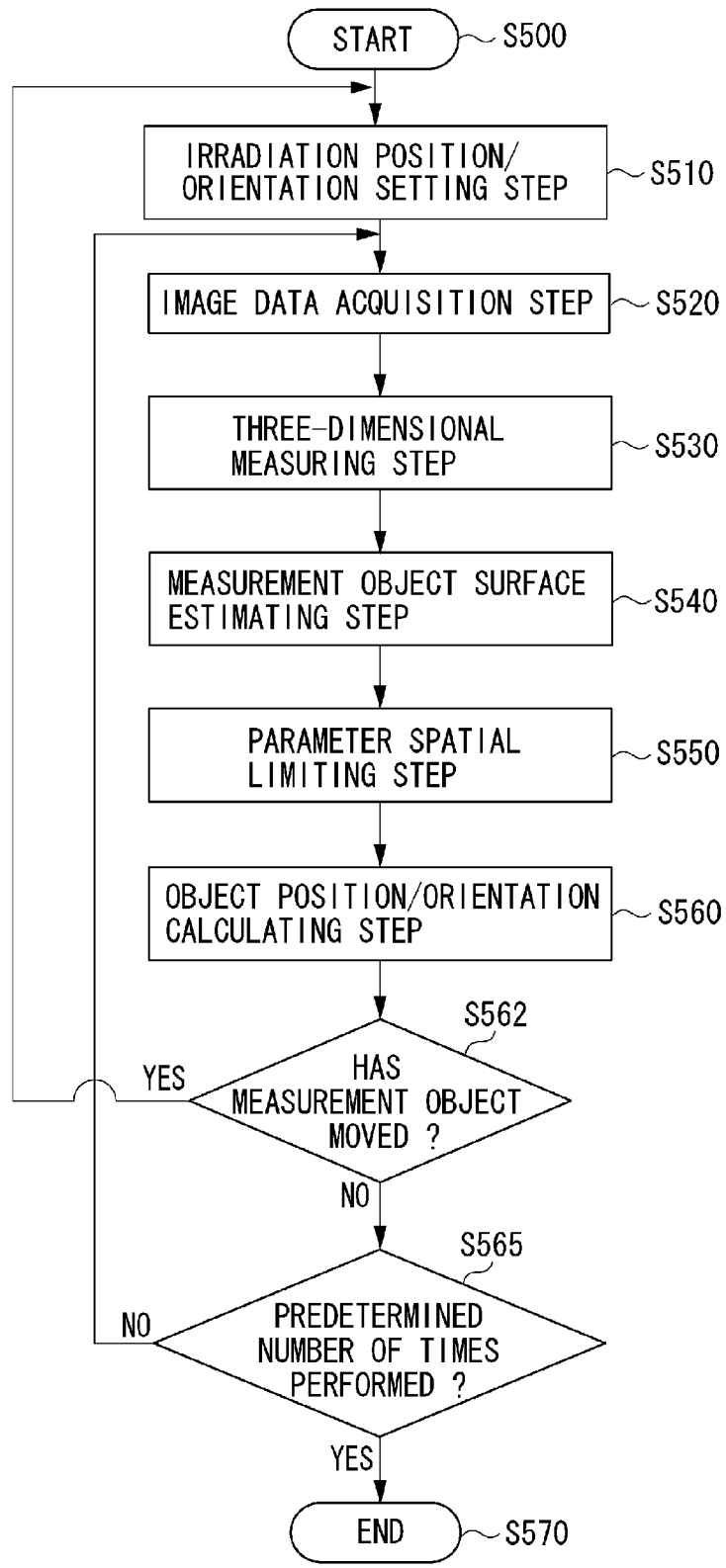
FIG. 17 illustrates a processing flow in the fifth exemplary embodiment.

A basic configuration in a fifth exemplary embodiment of the present invention is illustrated in FIG. 12 similar to the fourth exemplary embodiment. A specific con-figuration is illustrated as in FIG. 16. An actual processing flow is illustrated in FIG. 17.

Although basically similar to the fourth exemplary embodiment, if the measurement object has moved, the position/orientation of the light projection unit A100 is again controlled in the irradiation position/orientation setting step S510. A movement detection of the measurement object is performed by frame difference or optical flow estimation. If the movement of the measurement object has been detected, an irradiation position/orientation of the light projection unit A100 may be determined, according to the flow in FIG. 15, again similar to the fourth exemplary embodiment, or two-dimensional speed estimation such as optical flow estimation may be performed. Further, if the measurement object is grasped by a robot arm or rests on a belt conveyor or the like, the light projection unit A100 may be moved, assuming that a movement amount of the measurement object is known. The image data acquisition step S520 through the object position/orientation calculating step S560 perform similar processing to those in the image data acquisition step S110 through the object position/orientation calculating step S150 in the first exemplary embodiment. After having performed measurement and position/orientation calculation a predetermined number of times, the flow is terminated.

Figure 3:
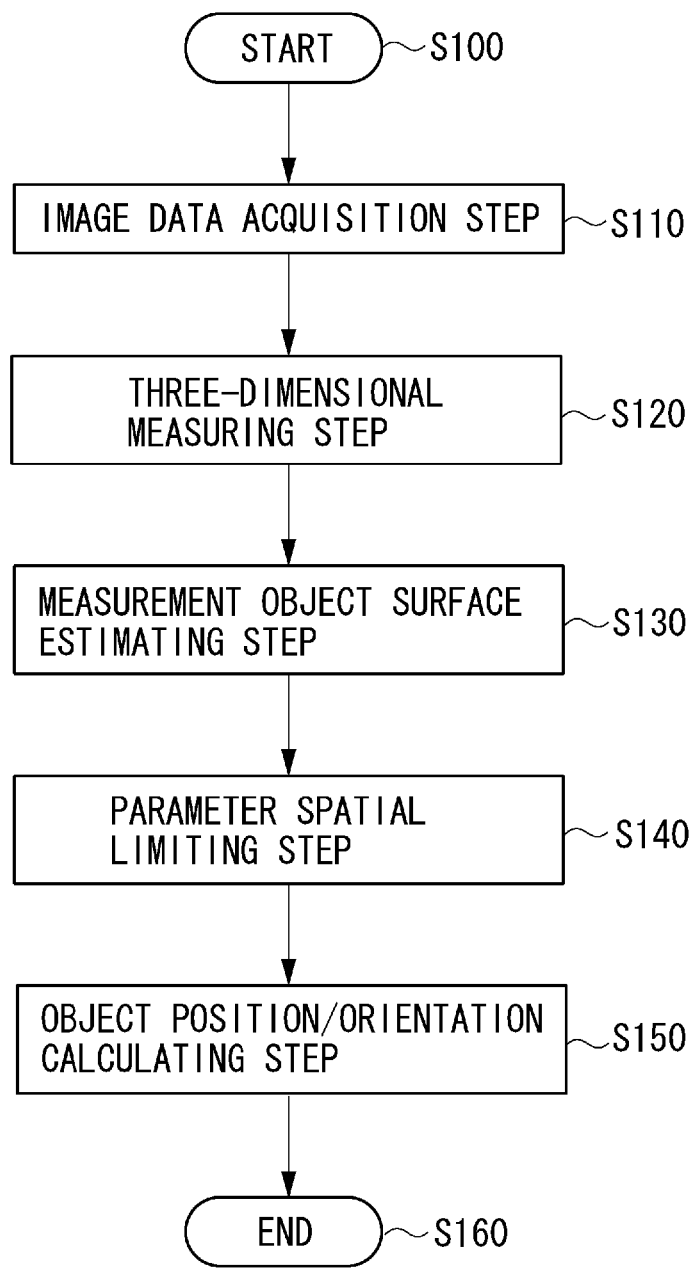
FIG. 3 illustrates a processing flow in the first exemplary embodiment.
Figure 4:
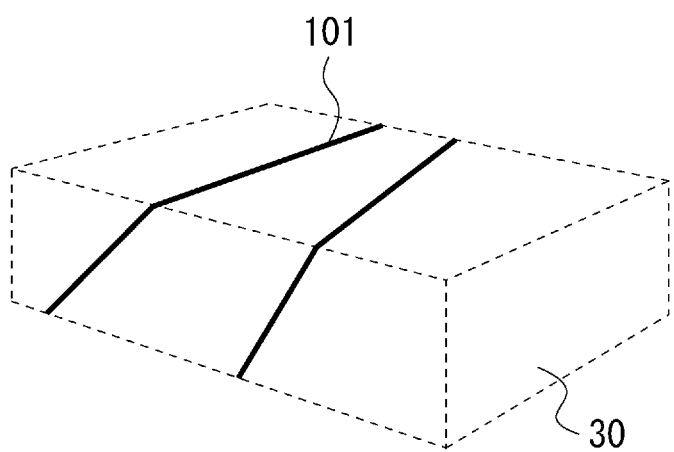
FIG. 4 illustrates a scene when three-dimensional measurement of a measurement object is being performed.
Figure 18:
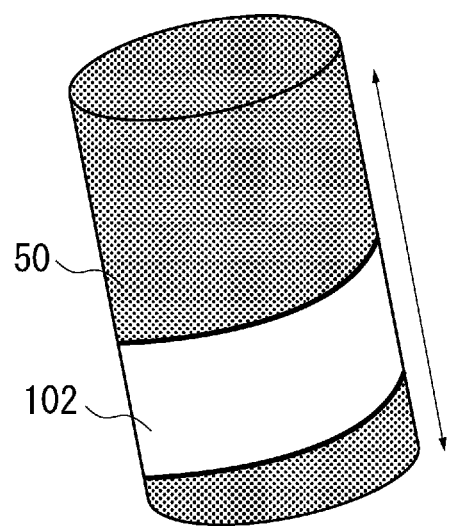
FIG. 18 illustrates a three-dimensional model and an irradiated curved surface in a sixth exemplary embodiment of the present invention.

A basic configuration in a sixth exemplary embodiment of the present invention is illustrated in FIG. 1 similar to the first exemplary embodiment, and a specific con-figuration is also illustrated in FIG. 3 similar to the first exemplary embodiment. Then, actual processing is such that work is performed according to the flow in FIG. 2 similar to the first exemplary embodiment. The three-dimensional model, owing to its circular cylinder as in FIG. 18, is constrained to a side surface of the circular cylinder. In the case of FIG. 18, since the three-dimensional model is subjected to curved surface constraint by a curved surface obtained in the measurement object surface estimating step S130, the image Jacobians in curved surface constraint are derived as described below. In the present exemplary embodiment, the three-dimensional model can be moved only in an axial direction of the cylinder, so that only the image Jacobian in the axial direction is derived.

Assuming a coordinate value which represents a certain point "x" in the estimated curved surface coordinate system to be $x_{cyl}=[x_{cyl}, y_{cyl}, z_{cyl}]$, and if a translational motion toward the axial direction is put as "d", then the derived image Jacobian is given as follows:

[Math. 17]

$$\frac{\partial u}{\partial d} = \begin{bmatrix} \frac{\partial u}{\partial d} \\ \frac{\partial v}{\partial d} \end{bmatrix} = \frac{\partial u}{\partial x_c} \cdot \frac{\partial x_c}{\partial x_w} \cdot \frac{\partial x_w}{\partial x_{cyl}} \cdot \frac{\partial x_{cyl}}{\partial d} \quad (22)$$

The three-dimensional model fitting processing can be performed by fitting of edge base similar to the first exemplary embodiment.

Figure 19:
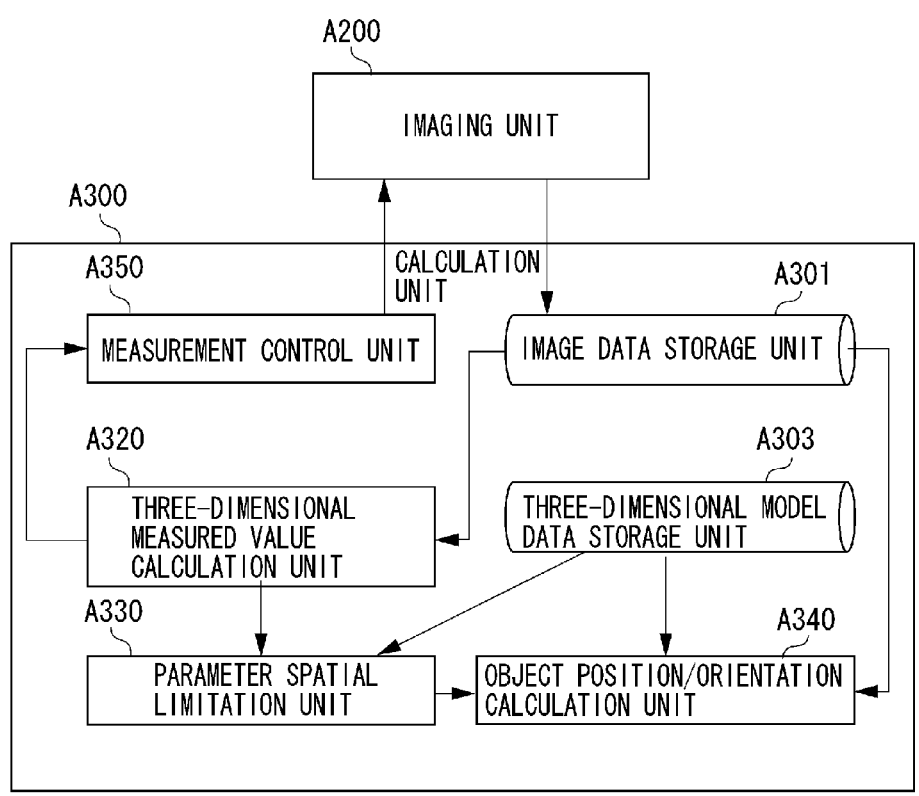
FIG. 19 illustrates a functional configuration of an information processing apparatus according to a seventh exemplary embodiment of the present invention.

FIG. 19 illustrates a functional configuration in a seventh exemplary embodiment of the present invention. A different point between the first exemplary embodiment and the present exemplary embodiment is that the light projection unit A100, the calibrated value calculation unit A310, and the calibrated value storage unit A302 are not included in the functional configuration, but the imaging unit A200 corresponds to the stereo camera 20.

Further, in the present exemplary embodiment, in the three-dimensional measuring step S120 and the measurement object surface estimating step S130, information indicating the surface shape of the measurement object is calculated using a stereo captured image and a parallax of the stereo camera 20. It becomes unnecessary to include the light projection unit 10 to the apparatus configuration, by performing the above-described configuration and processing, and it becomes possible to configure the apparatus by a simple configuration.

Figure 20:
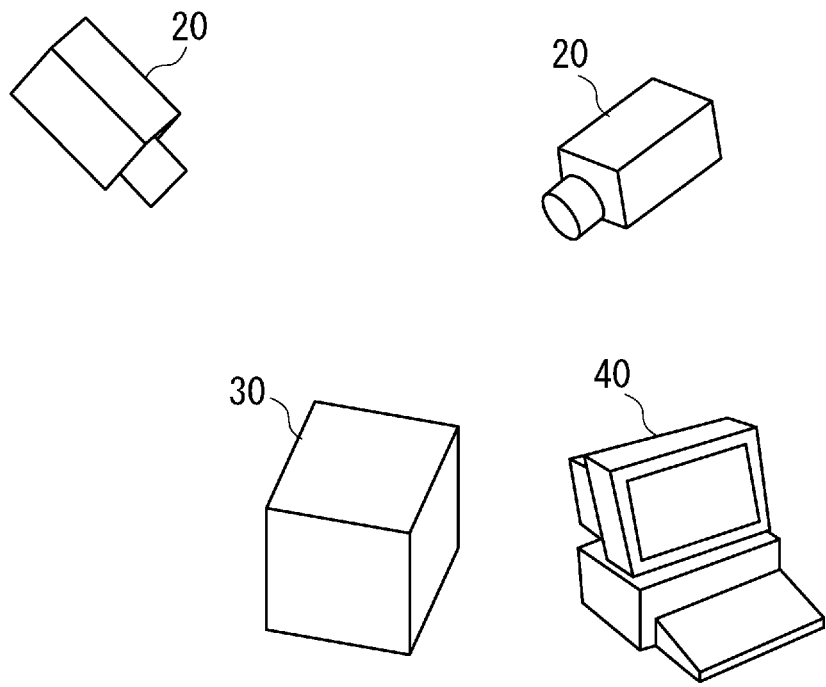
FIG. 20 illustrates a configuration of an information processing apparatus according to the seventh exemplary embodiment of the present invention.

A specific configuration of the present exemplary embodiment is illustrated in FIG. 20. A stereo camera 20, which corresponds to the imaging unit A200, is fixedly arranged. Images obtained by the stereo camera 20 are assumed to be images from which lens aberrations have been excluded by a publicly known calibration technique. A computer 40, which corresponds to the calculation unit A300, has as programs, the three-dimensional measured value calculation unit A320, the parameter spatial limitation unit A330, and the object position/orientation calculation unit A340. Further, the measurement control unit A350 (interface corresponding thereto) that can control the camera 20 is equipped. Further, a memory which can be utilized as the image data storage unit A301 is mounted, and can be utilized as the three-dimensional model data storage unit A303. The memory includes externally or internally a non-volatile storage device. The computer 40 is connected to the camera 20.

Figure 21:
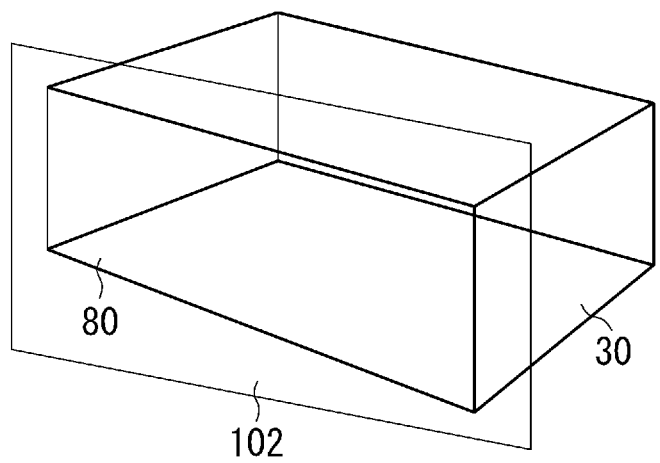
FIG. 21 illustrates a method for calculating a measurement object surface in the seventh exemplary embodiment.

Actual processing is performed similar to the first exemplary embodiment according to the flow in FIG. 2. However, in the three-dimensional measuring step S120, a parallax on images acquired by the image data storage unit A301 is measured, and a three-dimensional measurement result is obtained from a predefined distance between the cameras and a focal length of each camera lens. Further, in the measurement object surface estimating step S130, a plane equation or a curved surface equation is calculated by utilizing the three-dimensional measurement result obtained in the three-dimensional measuring step S120, taking a range 80 surrounded by edges or the like in which correspondence is established between the cameras as in FIG. 21 as a surface. In the case of FIG. 21, a measurement object plane 102 is estimated. At this time, the measurement object plane 102 may be applied not to the range bounded by edges or the like, but only applied to a partial region obtained by region segmentation or the like. The parameter space is limited based on the obtained surface information. The parameter spatial limiting step S140 and the object position/orientation calculating step S150 perform similar processing to those in the first exemplary embodiment.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-151479 filed Jun. 25, 2009, which is hereby incorporated by reference herein in its entirety.

The invention claimed is:

1. An information processing apparatus for matching a position and/or orientation of a measurement object with that of a model of the measurement object, the information processing apparatus comprising:
   an acquisition unit configured to acquire a captured image of the measurement object;
   a calculation unit configured to calculate information indicating a shape and a position and/or orientation of a surface of the measurement object based on the captured image; and
   a limitation unit configured to limit a position and/or orientation of the model based on the information indicating the shape and the position and/or orientation of the surface.

2. The information processing apparatus according to claim 1, further comprising a light projection control unit configured to cause a light projection unit to project pattern light onto the measurement object,
   wherein the calculation unit extracts a region of the pattern light from the captured image, and calculates the information indicating the surface shape based on the extracted region of the pattern light and a projection direction of the light projection unit.

3. The information processing apparatus according to claim 2, wherein the light projection control unit causes the light projection unit to project first pattern light from a first direction and to project second pattern light from a second direction different from the first direction,
   wherein the acquisition unit acquires a first captured image captured with the first pattern light and a second captured image captured with the second pattern light,
   wherein the calculation unit extracts a region of the first pattern light from the first captured image, calculates information indicating a first surface shape of the measurement object based on the extracted region of the first pattern light and the first direction, extracts a region of the second pattern light from the second captured image, and calculates information indicating a second surface shape based on the extracted region of the second pattern light and the second direction, and
   wherein the limitation unit limits setting of the position and/or orientation of the model based on the information indicating the first surface shape and the information indicating the second surface shape.

4. The information processing apparatus according to claim 2, wherein the pattern light projected by the light projection unit is multi-slit illumination light.

5. The information processing apparatus according to claim 1, further comprising a position/orientation calculation unit configured to calculate the position and/or orientation of the measurement object by matching the position and/or orientation of the measurement object with that of the model.

6. The information processing apparatus according to claim 1, wherein the information indicating the surface shape is a plane equation that expresses a surface of the measurement object, and
   wherein the limitation unit limits the position and/or orientation of the model to a movable range when the model is caused to rotate and/or parallel move on a plane expressed by the plane equation.

7. The information processing apparatus according to claim 1, wherein the information indicating the surface shape is a curved surface equation that expresses a surface of the measurement object.

8. The information processing apparatus according to claim 1, wherein the captured image is a stereo captured image captured by a stereo camera, and wherein the calculation unit calculates the information indicating the surface shape of the measurement object based on the stereo captured image and a parallax of the stereo camera.

9. An information processing method for matching a position and/or orientation of a measurement object with that of a model of the measurement object, the information processing method comprising:
   acquiring a captured image of the measurement object using an imaging unit;
   calculating information indicating a shape and a position and/or orientation of a surface of the measurement object based on the captured image; and
   limiting a position and/or orientation of the model based on the information indicating the shape and the position and/or orientation of the surface.

10. A non-transitory computer-readable storage medium storing a computer program for causing a computer to act as an information processing apparatus for matching a position and/or orientation of a measurement object with that of a model of the measurement object, the information processing apparatus comprising:
    an acquisition unit configured to acquire a captured image of the measurement object;
    a calculation unit configured to calculate information indicating a shape and a position and/or orientation of a surface of the measurement object based on the captured image; and
    a limitation unit configured to limit a position and/or orientation of the model based on the information indicating the shape and the position and/or orientation of the surface.

11. An information processing apparatus for matching a position and/or orientation of a measurement object with that of a model of the measurement object, the information processing apparatus comprising:
    an acquisition unit configured to acquire a captured image of the measurement object;
    a resolution reduction unit configured to reduce a resolution of the captured image;

a calculation unit configured to calculate the position and/or orientation of the measurement object based on the captured image with reduced resolution;

a light projection control unit configured to cause a light projection unit to project pattern light onto the measurement object based on the calculated position and/or orientation of the measurement object.

12. An information processing apparatus for matching a position and/or orientation of a measurement object with that of a model of the measurement object, the information processing apparatus comprising:

an acquisition unit configured to acquire a captured image of the measurement object;

a calculation unit configured to calculate information indicating a position and/or orientation of the measurement object based on the captured image; and a limitation unit configured to limit a range of a position and/or orientation of the model based on the calculated information.

13. The information processing apparatus according to claim 12, further comprising a light projection control unit configured to cause a light projection unit to project a pattern onto the measurement object, wherein the calculation unit extracts a region of the pattern from the captured image, and calculates the information indicating a position and/or orientation of the measurement object based on the extracted region of the pattern and a projection direction of the light projection unit.

14. The information processing apparatus according to claim 13, wherein the pattern projected by the light projection unit is multi-slit illumination light.

15. The information processing apparatus according to claim 12, wherein the model is represented by using computer graphics.

16. The information processing apparatus according to claim 12, further comprising a position/orientation calculation unit configured to calculate the position and/or orientation of the measurement object by associating the position and/or orientation of the measurement object with that of the model based on the limited range of the position and/or orientation of the model.

17. The information processing apparatus according to claim 12, wherein the limitation unit limits the position and/or orientation of the model to a movable range within a predetermined range in a processing of the position/orientation calculation unit.

18. The information processing apparatus according to claim 12, wherein the captured image is a stereo captured image captured by a stereo camera, and wherein the calculation unit calculates the information indicating the position and/or orientation of the measurement object based on the stereo captured image and a parallax of the stereo camera.

19. The apparatus according to claim 12, wherein the limit unit limits the range of the position and/or orientation of the model by fixing a value in at least one of dimensions with respect to the position and/or orientation of the model.

20. An information processing method for matching a position and/or orientation of a measurement object with that of a model of the measurement object, the information processing method comprising:

acquiring a captured image of the measurement object using an imaging unit;

calculating information indicating a position and/or orientation of the measurement object based on the captured image; and limiting a range of a position and/or orientation of the model based on the calculated information.

21. A non-transitory computer-readable-storage medium storing a program for causing a computer to execute the position and orientation calibration method according to claim 20.

22. An apparatus comprising:

an acquisition unit configured to acquire a captured image including an object;

a holding unit configured to hold a model representing a shape of the object;

a calculating unit configured to calculate information indicating a position and/or orientation of the object based on the captured image;

a fixing unit configured to fix a value in at least one of dimensions with respect to a position and/or orientation of the model;

an associating unit configured to associate the model with the captured image by varying a value in at least one of dimensions which is different from the dimension in which the value is fixed; and a deriving unit configured to derive a position and/or orientation of the object based on a result associated by the associating unit.

23. The apparatus according to claim 22, further comprising a projection unit configured to project a pattern onto the object.

24. A method comprising:

acquiring a captured image including an object;

calculating information indicating a position and/or orientation of the object based on the captured image;

fixing a value in at least one of dimensions with respect to a position and/or orientation of a model representing a shape of the object, the model being held in a holding unit;

associating the model with the captured image by varying a value in at least one of dimensions which is different from the dimension in which the value is fixed; and deriving a position and/or orientation of the object based on an associated result.

25. A non-transitory computer-readable-storage medium storing a program for causing a computer to execute the position and orientation calibration method according to claim 24.

* * * * *